US012777230B2

(12) United States Patent
Panchagnula

(10) Patent No.: US 12,777,230 B2
(45) Date of Patent: Oct. 27, 2026

(54) METHOD AND SYSTEM FOR PROVIDING ENCODED STREAMING CONTENT TO CONTENT VIEWERS

(71) Applicant: Jiostar India Private Limited, Mumbai (IN)

(72) Inventor: Ramesh V. Panchagnula, Mumbai (IN)

(73) Assignee: JIOSTAR INDIA PRIVATE LIMITED, Mumbai (IN)

( * ) Notice: Subject to any disclaimer, the term of this patent is extended or adjusted under 35 U.S.C. 154(b) by 360 days.

(21) Appl. No.: 18/316,799

(22) Filed: May 12, 2023

(65) Prior Publication Data

US 2023/0370683 A1 Nov. 16, 2023

(30) Foreign Application Priority Data

May 13, 2022 (IN) ............................. 202221027614

(51) Int. Cl.

| | |
|---|---|
| ***H04N 19/00*** | (2014.01) |
| ***G06T 7/11*** | (2017.01) |
| ***G06V 10/70*** | (2022.01) |
| ***H04N 19/134*** | (2014.01) |
| ***H04N 19/137*** | (2014.01) |
| ***H04N 19/176*** | (2014.01) |
| ***H04N 19/184*** | (2014.01) |
| ***H04N 21/00*** | (2011.01) |
| ***H04N 21/258*** | (2011.01) |
| ***H04N 21/472*** | (2011.01) |

(52) U.S. Cl.

CPC ......... *H04N 21/47217* (2013.01); *G06T 7/11* (2017.01); *G06V 10/70* (2022.01); *H04N 19/134* (2014.11); *H04N 19/137* (2014.11); *H04N 19/176* (2014.11); *H04N 19/184* (2014.11); *H04N 21/25891* (2013.01)

(58) Field of Classification Search

None

See application file for complete search history.

(56) References Cited

U.S. PATENT DOCUMENTS

2012/0144444 A1* 6/2012 Hunt .................. H04N 21/8456 725/115

2017/0357518 A1* 12/2017 Kozloski ................. G06F 3/013

(Continued)

*Primary Examiner* — Zhihan Zhou

(74) *Attorney, Agent, or Firm* — EVERGREEN VALLEY LAW GROUP; Kanika Radhakrishnan

(57) ABSTRACT

Techniques for encoding video content are discloses. These techniques include generating an encoded video content corresponding to a first video content by encoding a plurality of image frames. This includes segmenting an image frame into image portions associated with a corresponding portion identifier, assigning a tag for each of the image portions based on: (i) information relating to a viewer for the video content or (ii) a corresponding image portion different from the respective image portion, where the tag relates to: (i) a resolution or (ii) a bitrate for encoding the respective image portion, and encoding each image portion based on the respective assigned tag. The techniques further include generating a record including the encoded video content and the plurality of portion identifiers and transmitting the encoded video content over a communication network. The record is used to reconstruct the first video content from the encoded video content.

13 Claims, 9 Drawing Sheets

(56) References Cited

U.S. PATENT DOCUMENTS

| | | | | |
|---|---|---|---|---|
| 2020/0267384 | A1 * | 8/2020 | Doron | H04N 21/21805 |
| 2021/0065360 | A1 * | 3/2021 | Laaksonen | G06V 10/25 |
| 2021/0174197 | A1 * | 6/2021 | Georgis | G06N 20/20 |
| 2021/0182947 | A1 * | 6/2021 | Wade | G06Q 30/0631 |
| 2021/0314670 | A1 * | 10/2021 | Atluru | H04N 21/4318 |
| 2022/0046237 | A1 * | 2/2022 | Xu | H04N 21/6547 |
| 2022/0368946 | A1 * | 11/2022 | Ding | H04N 19/105 |
| 2023/0135548 | A1 * | 5/2023 | Nishino | G06V 10/454 704/9 |

* cited by examiner

METHOD AND SYSTEM FOR PROVIDING ENCODED STREAMING CONTENT TO CONTENT VIEWERS

CROSS-REFERENCE TO RELATED APPLICATIONS

This application claims the benefit of and priority to India Provisional Patent Application No. 202221027614, filed May 13, 2022, the entire contents of which are incorporated herein by reference.

BACKGROUND

On-demand video streaming as well as live streaming of content has gained popularity in recent times. Users can use a variety of electronic devices to access streaming content, and the content can be accessed on the electronic devices using Over-The-Top (OTT) media services (i.e., over the Internet). For example, content items can be stored in Content Delivery Network (CDN) server and streamed to content viewers. Efficient storage, and streaming, of content to viewers has become more and more important as video streaming has gained popularity.

BRIEF DESCRIPTION OF THE FIGURES

The advantages and features of the invention will become better understood with reference to the detailed description taken in conjunction with the accompanying drawings, wherein like elements are identified with like symbols, and in which.

Figure 1:
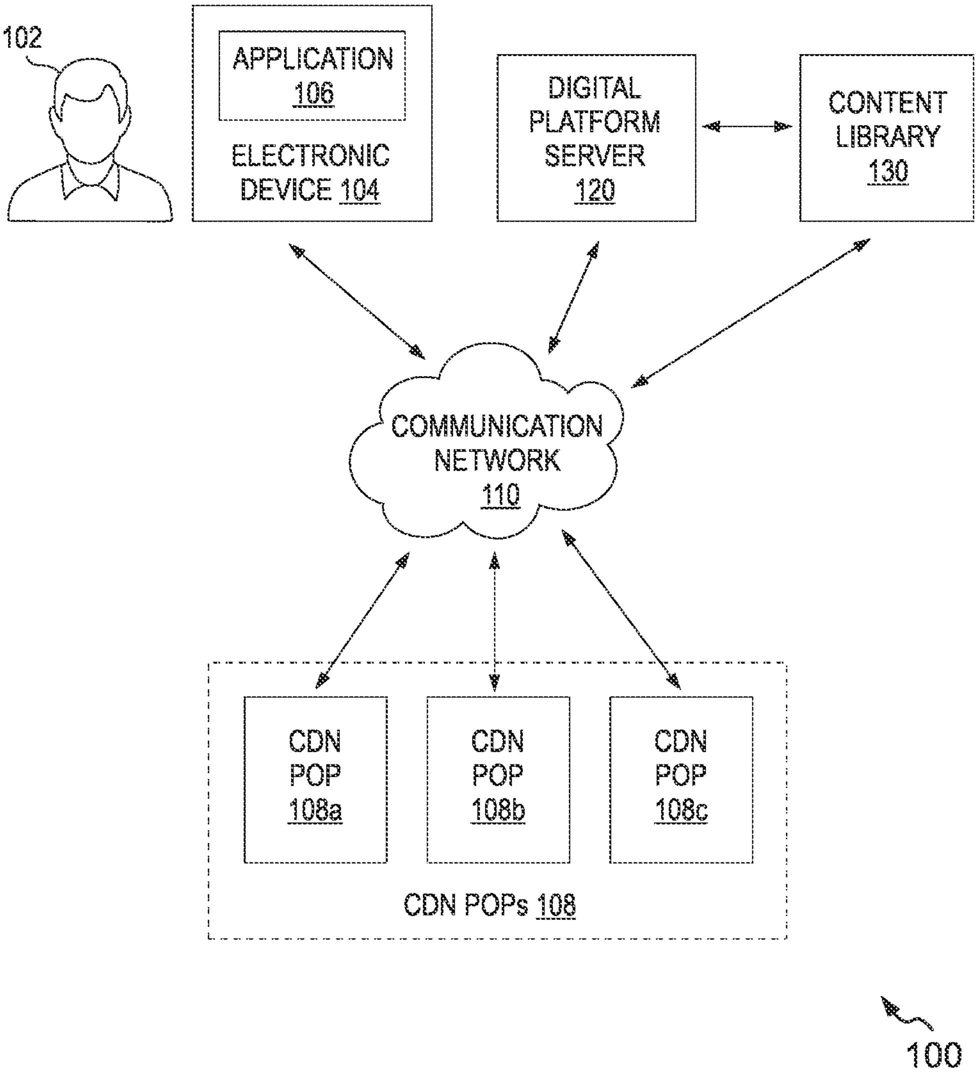
FIG. 1 is a representation for illustrating delivery of content from a streaming content provider to a viewer, in accordance with an example scenario.

The drawings referred to in this description are not to be understood as being drawn to scale except if specifically noted, and such drawings are only exemplary in nature.

DETAILED DESCRIPTION

In an embodiment, each content item to be streamed to content viewers can be encoded as per multiple encoding profiles and stored in a repository associated with the CDN server. For example, a movie content may be encoded using codecs associated with multiple encoding standards, such as H.264, H.265, VP8, VP9, AOMedia Video 1 (AVI), Versatile Video Coding (VVC), and the like. Further, for each encoding standard, the content may be encoded at multiple resolutions such as 360p, 480p, 720p, 1080p, and 4 K/Ultra-high Definition (UHD) resolution to configure multiple sets of encoding profiles (also known as 'encoding ladders'). The term 'encoding profile' as used herein corresponds to a set of streams corresponding to a content item, where each stream is characterized by an encoding bitrate (r), a spatial resolution (s), a frame rate (fps) and a Video Multimethod Assessment Function (VMAF) value (v). For example, media content may be encoded using H.264 standard at a bitrate of 400 Kbps, a spatial resolution of 360p, a frame rate of fps, and a VMAF of 75 to configure one encoded stream. Similarly, video content may be encoded using H.264 standard at a bitrate of 500 Kbps, a spatial resolution of 480p, a frame rate of fps and VMAF of 80 to configure another encoding stream. Multiple such streams of content encoded as per H.264 standard configure one 'encoding profile'. Similarly, video content may be encoded using H.265 standard at one or more resolutions, frame rates and VMAF scores to generate multiple encoded streams of video content, thereby configuring another encoding profile. Depending upon factors like underlying network conditions and/or attributes associated with a content viewer's device used for content playback, an appropriate encoding profile is chosen for streaming content from the CDN to the content viewer's device.

The streaming content, once encoded as per different encoding profiles, may be segmented into chunks for transmission from the CDN to the content viewer's device. The sequence of segments corresponding to a content stream encoded as per an encoding profile is configured to generate a rendition of the content on the display screen of the content viewer's device. In cases where there is a change in network conditions or change in attributes associated with the device playing the content, the streaming of content has to be switched from one rendition to another. More specifically, the streaming of content has to be adapted from a segment in a sequence of segments corresponding to one encoding profile to a next appropriate segment in a sequence of segments corresponding to another encoding profile. Moreover, the switching from one rendition to another rendition needs to be performed in a manner such that a content viewer does not observe any drastic change in content viewing experience before and after switching of content stream renditions.

In many cases, a content viewer's device or general underlying conditions may be known in advance and it may be a waste of resources to maintain several encoding profiles of streaming content for such a content viewer. For example, if a content viewer is associated with a high-end smartphone and lives in a part of a metropolitan city with good network coverage, then maintaining encoding profiles associated with low resolution and low bitrate combinations may be a waste of resources. Similarly, if a content viewer is associated with a basic smartphone, which is incapable of displaying high resolution content, and whose network connection is patchy, then maintaining encoding profiles associated with high resolution and high bitrate combinations may not be the most efficient use of resources. In addition to the inefficacy of maintaining a large number of encoding profiles, the frequent switching of content streams from one rendition to another incurs a processing load on the content viewer's device. For example, the content viewer's device may include a buffer which is configured to fetch segments of encoded content from the CDN in advance and store the fetched segments corresponding to a rendition. When the encoding profile is switched due to underlying network conditions or otherwise, a timestamp of switching the rendition needs to be considered while requesting the next appropriate segment from another rendition. Moreover, the fetched segments in the buffer also need to appropriately managed (e.g., discarded in full or partly discarded) based on the next segment being fetched from the CDN.

One or more techniques described herein provide improved encoded streaming of content to content viewers in a manner that makes efficient use of resources on the CDN-side and incurs less processing load on the content viewer's device side. Moreover, the switching of content streams from one rendition to another is performed in a manner such that a content viewer does not observe any drastic change in content viewing experience before and after switching of content stream renditions. In an embodiment, content can be encoded by segmenting image frames into a number of portions, assigning a tag to each portion, and using the tag to identify encoding characteristics for the portion (e.g., resolution, bitrate, or any other suitable characteristics). Thus a given frame can be divided into multiple portions encoded at different resolutions, bitrates, etc. For example, the resolution for each portion can be determined based on information about the viewer of the content (e.g., viewer preference information) and characteristics of nearby frames (e.g., resolution or bitrate for adjacent frames).

In an embodiment, one or more techniques disclosed herein have numerous technical advantages. For example, instead of encoding a content video frame at a uniform resolution and bitrate, different portions of a video frame can be encoded at different resolutions or bitrates. This significantly reduces storage space needed for the encoded content, significantly reduces network bandwidth needed for transmission of the encoded content, and significantly reduces the computational burden on viewer devices. Further, a machine learning model (e.g., a supervised machine learning model) can be used to tag portions of the video frame and identify the desired encoding characteristics of the portions (e.g., resolution and bitrate). Using a machine learning model can be a significant improvement over other techniques by improving tagging accuracy (e.g., identifying an improved encoding solution for portions of an image frame), because more accurate tagging can result in encoding that reduces the storage space, bandwidth, and computational resources used, while maintaining the viewer experience.

Further, various embodiments of the present disclosure provide multiple technical advantages for encoding media content by reducing processing load and storage requirements at the CDN and viewer's end. One or more disclosed techniques provide an approach for improving the encoding process based on viewer cohorts and tag assignment rules, thereby enabling the most efficient use of resources on the CDN side, and incurring less processing load on the content viewer's device side. Moreover, optimized encoding of streaming content ensures that the switching of the content streams from one rendition to another is performed in a manner such that a content viewer does not observe any drastic change in content viewing experience before and after switching content stream renditions. Further, the streaming content is personalized using targeted content in real-time to provide an enjoyable and seamless content viewing experience to the content viewer. Further, audio encoding helps to make the decoding process at the content viewer's device side leaner, thus leading to better performance as well The embodiments illustrated in FIGS. 1 to 8 are described herein for illustrative purposes and are subject to many variations. It is understood that various omissions and substitutions of equivalents are contemplated as circumstances may suggest or render expedient but are intended to cover the application or implementation without departing from the spirit or scope of the invention. Further, it is to be understood that the phraseology and terminology employed herein are for the purpose of the description and should not be regarded as limiting. Any heading utilized within this description is for convenience only and has no legal or limiting effect.

The terms "a" and "an" herein do not denote a limitation of quantity, but rather denote the presence of at least one of the referenced items.

FIG. 1 is a representation 100 for illustrating delivery of content from a streaming content provider to a viewer 102, in accordance with an example scenario.

In an embodiment, a 'streaming content provider' can be an entity that holds digital rights associated with digital content, i.e., media content, present within digital video content libraries, offers the content on a subscription basis by using a digital platform and over-the-top (OTT) media services, i.e., content is streamed over the Internet to the electronic devices of the subscribers, i.e., content viewers. A streaming content provider is hereinafter referred to as a 'content provider' for ease of description.

The content offered by the content provider may be embodied as streaming media content such as live streaming content or on-demand media streaming content. It is noted that though the content offered by the content provider is explained at various points with reference to video content, the term 'content' as used hereinafter may not be limited to only video content. Indeed, the term 'content' may refer to any media content including but not limited to 'video content', 'audio content', 'gaming content', 'textual content', and any combination of such content offered in an interactive or non-interactive form. Accordingly, the term 'content' is also interchangeably referred to hereinafter as 'media content' for the purposes of description. Though a content provider is not shown in FIG. 1, a digital platform server 120 and a content library 130 associated with a content provider are shown in the representation 100.

Individuals wishing to view/access the content may subscribe to at least one type of subscription offered by the content provider. Accordingly, the terms 'subscriber', 'user', 'content viewer', and 'viewer' as interchangeably used herein may refer to a viewer of content (e.g., subscribed content), which is offered by the content provider.

The representation 100 depicts the viewer 102 controlling an electronic device 104 for viewing and accessing content offered by the content provider. It is noted that the viewer 102 may use one or more electronic devices, such as a smartphone, a tablet, a laptop, a desktop, a personal computer, a wearable device or any other suitable computing device to view the content provided by the content provider. The viewer 102 may have downloaded a software application 106 (hereinafter referred to as an 'application 106' or an 'app 106') corresponding to at least one content provider on the electronic device 104.

In one illustrative example, the viewer 102 may access a Web interface associated with the application 106 provided by a content provider on the electronic device 104. It is understood that the electronic device 104 may be in operative communication with a communication network 110, such as the Internet, enabled by a network provider, also known as an Internet Service Provider (ISP). The electronic device 104 may connect to the communication network 110 using a wired network, a wireless network, or a combination of wired and wireless networks. Some non-limiting examples of the wired networks may include Ethernet, a Local Area Network (LAN), a fiber-optic network, and the like. Some non-limiting examples of wireless networks may include Wireless LAN (WLAN), cellular networks, Bluetooth or ZigBee networks, and the like.

The electronic device 104 may fetch the Web interface associated with the application 106 over the communication network 110 and cause display of the Web interface on a display screen (not shown) of the electronic device 104. In an illustrative example, the Web interface may display a plurality of content titles corresponding to the content offered by the content provider to its consumers (e.g., viewers).

In an illustrative example, the viewer 102 may select a content title from among the plurality of content titles displayed on the display screen of the electronic device 104. The selection of the content title may trigger a request for a playback Uniform Resource Locator (URL). The request for the playback URL is sent from the electronic device 104 via the communication network 110 to a digital platform server 120 associated with the content provider. In at least some embodiments, the digital platform server 120 may include at least one of a Content Management System (CMS) and a User Management System (UMS) for facilitating a streaming of digital content from a content library 130 of the content provider to a plurality of users, such as the viewer 102. The digital platform server 120 is configured to authenticate the viewer 102 and determine if the viewer 102 is entitled to view the requested content. To this effect, the digital platform server 120 may be in operative communication with one or more remote servers, such as an authentication server and an entitlement server. The authentication server and the entitlement server are not shown in FIG. 1. The authentication server may facilitate authentication of viewer account credentials using standard authentication mechanisms. The entitlement server may facilitate determination of the viewer's subscription type (e.g., whether the user has subscribed to regular or premium content) and status (e.g., whether the subscription is still active or is it expired), which in turn may enable determination of whether the viewer 102 is entitled to view and access the requested content or not.

Further, the digital platform server 120 extracts an Autonomous System Number (ASN) and an IP address from the playback URL request, and identifies at least one Content Delivery Network (CDN) Point of Presence (PoP), which is in the proximity of the location of the viewer 102. As an illustrative example three CDN PoPs, shown as a CDN PoP **108*a*, a CDN PoP 108*b* and a CDN PoP 108*c* in FIG. 1, are depicted to be identified as CDN PoPs in the proximity of the location of the viewer 102**.

The CDN PoP **108*a*, 108*b* and 108*c* are hereinafter collectively referred to CDN Points of Presence (PoPs) 108. The digital platform server 120 performs a check to determine if the content associated with requested content title is cached in at least one CDN PoP from among the CDN PoPs 108. It is noted that the requested content may have been cached from the content library 130 of the content provider to one or more CDN PoPs from among the CDN PoPs 108. If the content is not cached in the CDN PoPs, the digital platform server 120 checks whether any other CDN or CDN PoP in the vicinity of the CDN PoPs 108 is caching the content requested with content title or not. If the content is cached in one or more CDN PoPs from among the CDN PoPs 108 and/or in any other CDN/CDN PoP, the digital platform server 120 identifies a preferred CDN PoP. For example, the digital platform server 120** can identify the preferred CDN PoP by taking into account the location of the user, a content ID, performance metrics associated with the CDNs or CDN PoPs, or any other suitable factors.

In the event that the content associated with the requested content title is not cached with any of the CDNs/CDN PoPs, the digital platform server 120 may be configured to cache the content from the content library 130 to a CDN PoP nearest to a location of the viewer 102. The digital platform server 120 is configured to encode the content as per multiple encoding profiles and cause storage of the plurality of encoded versions of the content in the CDN PoP nearest to the location of the viewer 102. It is noted that the content, and especially high resolution video content, needs to be compressed for optimizing a bandwidth usage and, therefore, the content is encoded (e.g., compressed) prior to storage in a CDN PoP. As the digital platform server 120 is not aware of the underlying network conditions or the playback quality currently being experienced by the viewer 102, the digital platform server 120 may encode the content using codecs associated with multiple encoding standards, such as H.264, H.265, VP8, VP9, AOMedia Video 1 (AVI), Versatile Video Coding (VVC), and the like. Further, for each encoding standard, the content may be encoded at multiple resolutions such as 360p, 480p, 720p, 1080p and 4 K/Ultra high Definition (UHD) resolution to configure multiple sets of encoding profiles (also known as 'encoding ladders'). The term 'encoding profile' as used herein corresponds to a set of streams corresponding to a content item, where each stream is characterized by an encoding bitrate (r), a spatial resolution (s), a frame rate (fps) and a Video Multimethod Assessment Function (VMAF) value (v). For example, video content may be encoded using H.264 standard at a bitrate of 400 Kbps, a spatial resolution of 360p, a frame rate of 30 fps and VMAF of 75 to configure one encoded stream. Similarly, video content may be encoded using H.264 standard at a bitrate of 500 Kbps, a spatial resolution of 480p, a frame rate of 30 fps and VMAF of 80 to configure another encoding stream. Multiple such streams of content encoded as per H.264 standard configure one 'encoding profile'. Similarly, video content may be encoded using H.265 standard at one or more resolutions, frame rates and VMAF scores to generate multiple encoded streams of video content, thereby configuring another encoding profile.

As mentioned above, the digital platform server 120 may encode the content as per multiple encoding profiles and cache the content in the CDN PoP. The digital platform server 120 provides a playback URL identifying the network/IP address of the CDN PoP in which the content is cached, to the electronic device 104 of the user 102. The electronic device 104 is configured to generate a Hypertext Transfer Protocol (HTTP) request using the playback URL and provide the HTTP request over the communication network 110 to the CDN PoP to fetch the requested content and display the content to the viewer 102 on a display screen of the electronic device 104.

The electronic device 104 may employ adaptive bitrate (ABR) streaming to fetch the content from the CDN PoP. More specifically, the electronic device 104 may first identify an encoding profile from among the multiple encoding profiles based on the current network condition. For example, if the network condition is poor, the electronic device 104 may fetch an encoded stream at lower resolution, such as 360p or 480p, whereas the electronic device 104 may fetch an encoded stream at higher resolution, such as 1080p if the network quality is excellent and if the screen size and a resolution associated with the electronic device 104 supports such a resolution. Further, the encoding profile may be fetched at a bitrate that minimizes or avoids buffering or stalling of the playback, or severe degradation in the quality of playback. For example, a bitrate for fetching a slice of encoded content may be reduced from 1400 Kbps to 500 Kbps if the network quality is poor. Moreover, the bitrate may be dynamically adapted as per fluctuations in the network throughput.

The aforementioned process of delivering content, though useful, may be suboptimal and may have one or more drawbacks. For example, a CDN POP caches a large number of encoded streams corresponding to each content irrespective of the fact that the electronic device 104 may request content as per only few encoded profiles. For example, if a user stays in a location, which has excellent network connectivity in general, then caching of encoded streams as per all available encoding profiles is sub optimal. Similarly, if a user is known to always use a Wi-Fi connection instead of a cellular network connection for watching content, then caching content as per all available encoding profiles may be sub optimal. Moreover, in some cases where the device switches between playing different renditions i.e., different streams of encoding profiles, the timestamp in which a switch occurs from one segment in a rendition to subsequent segment in a different rendition has to match to provide seamless experience. In some cases, the electronic device 104 may avoid playing streams of a rendition that were previously loaded in a buffer of the electronic device 104 to match the playback rate (e.g., starting point) of the other rendition to which the electronic device 104 switched for playing content due to some network issues. Further, such switching increases processing of content providers and also increases consumption of bandwidth for streaming the content to the electronic device 104 of the user 102.

Various embodiments of the present invention provide a system and a method for providing encoded streaming content to content viewers. As discussed above, the encoding of the streaming content is improved to make efficient use of resources on the CDN-side and incur less processing load on the content viewer's device side. Moreover, improved encoding of streaming content ensures that the switching of content streams from one rendition to another is performed in a manner such that a content viewer does not observe any drastic change in content viewing experience before and after switching of content stream renditions. Further, the streaming content is personalized based on camera metadata in real-time to provide an enjoyable and seamless content viewing experience to the users. An example system for improved encoding content for content viewers is explained next with reference to FIG. 2.

Figure 2:
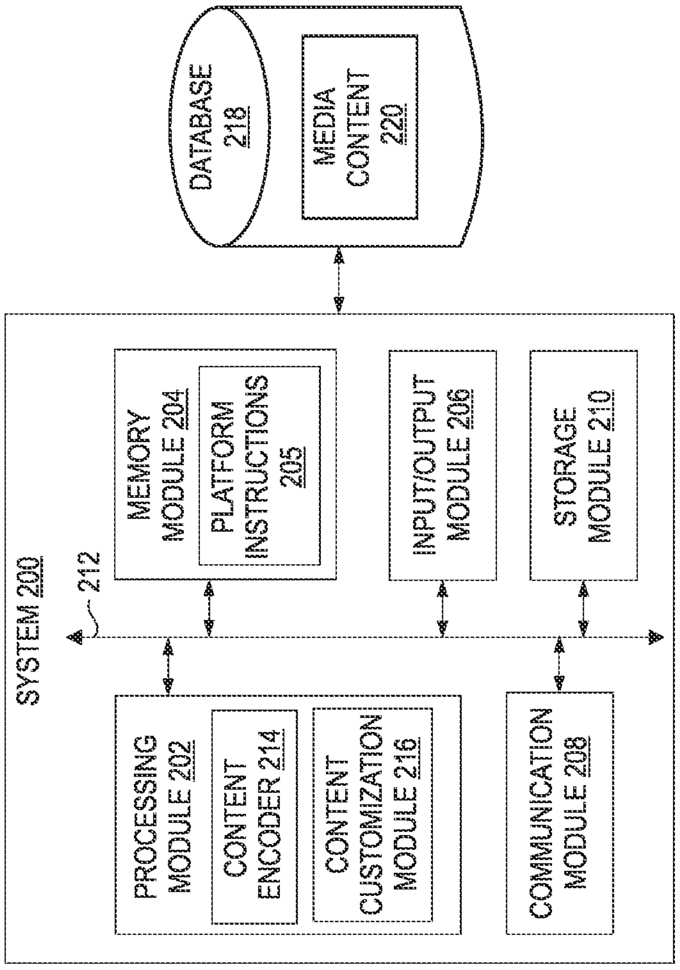
FIG. 2 is a block diagram of a system for improved encoding of media content for content viewers, in accordance with an embodiment of the invention.

FIG. 2 is a block diagram of a system 200 for providing encoded streaming content to content viewers, in accordance with an embodiment of the invention. The system 200 is configured for improved encoding of the streaming content prior to providing the streaming content to each content viewer. The system 200 may be implemented as part of a digital platform server, such as the digital platform server 120 shown in FIG. 1. In some embodiments, the system 200 may be deployed within the digital platform server, or may be placed external to, and in operative communication with, the digital platform server 120. In other embodiments, the system 200 may be implemented as a part of a CDN such as an origin CDN server, a public CDN server, a private CDN server, a Telcom CDN server, an Internet Service Provider (ISP) CDN server, a CDN POP 108 server, or any other suitable implementation.

The system 200 is depicted to include a processing module 202, a memory module 204, an input/output (I/O) module 206 and a communication module 208 and a storage module 210. The processing module 202 is further configured to include a content encoder 214 and a content customization module 216. It is noted that although the system 200 is depicted to include the processing module 202, the memory module 204, the input/output (I/O) module 206, the communication module 208 and the storage module 210, in some embodiments, the system 200 may include more or fewer components than those depicted herein. The various components of the system 200 may be implemented using hardware, software, firmware or any combination thereof.

In one embodiment, the processing module 202 may be embodied as a multi-core processor, a single core processor, or a combination of one or more multi-core processors and one or more single core processors. For example, the processing module 202 may be embodied as one or more of various processing devices, such as a coprocessor, a microprocessor, a controller, a digital signal processor (DSP), a processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like. In one embodiment, the memory module 204 is capable of storing machine executable instructions, referred to herein as platform instructions 205. Further, the processing module 202 is capable of executing the platform instructions 205. In an embodiment, the processing module 202 may be configured to execute hard-coded functionality. In an embodiment, the processing module 202 is embodied as an executor of software instructions, wherein the instructions may specifically configure the processing module 202 to perform the algorithms and/or operations described herein when the instructions are executed. For example, in at least some embodiments, each component of the processing module 202 may be configured to execute instructions stored in the memory module 204 for realizing respective functionalities, as will be explained in further detail later.

The memory module 204 may be embodied as one or more non-volatile memory devices, one or more volatile memory devices and/or a combination of one or more volatile memory devices and non-volatile memory devices. For example, the memory module 204 may be embodied as semiconductor memories, such as flash memory, mask ROM, PROM (programmable ROM), EPROM (erasable PROM), RAM (random access memory), etc. and the like. In at least some embodiments, the memory module 204 may store a machine learning model (not shown in FIG. 2). The machine learning model is configured to facilitate assignment of tags for different image portions in an image frame for encoding the image frame as will be explained in further detail later. In an embodiment, any suitable machine learning model can be used, including a suitable neural network (e.g., a deep learning neural network, a convolutional neural network, or any other suitable neural network), another suitable supervised machine learning model, or an unsupervised machine learning model.

In at least some embodiments, the memory module 204 stores logic and/or instructions, which may be used by modules of the processing module 202, such as the content encoder 214 and the media customization module 216. For example, the memory module 204 includes instructions for (1) identifying a cohort for a content viewer based on online viewer behavior, (2) segmenting an image frame into a plurality of image portions, (3) indexing each image portion with a sequence number based on corresponding position in the image frame, (4) assigning an image tag for each image portion in the image frame based on identified cohort and one or more tag assignment rules, (5) encoding each image portion at a resolution and/or bitrate based on the assigned image tag, (6) generating a media rendition record including encoded media content corresponding to encoding the each image portion at different resolution and/or different bit rates. In an embodiment, streaming the encoded media content reduces memory consumption, and processing requirements while cutting down on bandwidth significantly as opposed to streaming the conventional media content. The communication circuitry may further be configured to enable transmission of the media rendition record including the encoded media content directly to at least one CDN such as, the CDN 108*b* (shown in FIG. 1). For example, media content can be made up of a plurality of image frames and a plurality of audio frames. Therefore, it should be noted that the various embodiments of the present invention can be applied to audio processing as well. In particular, the memory module 204 may also include instructions for (1) segmenting an audio frame into a plurality of audio portions, (2) indexing each audio portion with a sequence number based on corresponding position in the audio frame, (3) assigning an audio tag for each audio portion in the audio frame based on identified cohort and a one or more tag assignment rules, (4) encoding each audio portion at a bitrate based on the assigned audio tag, (5) generating a media rendition record including encoded media content corresponding to encoding the each audio portion at different bit rates. It should also be noted that the encoding process described herein for both image frames and audio frames can be combined as well for improving the encoding performance even further. This aspect will be explained in further detail later.

In an embodiment, the I/O module 206 may include mechanisms configured to receive inputs from and provide outputs to an operator of the system 200. The term 'operator of the system 200' as used herein may refer to one or more individuals, whether directly or indirectly associated with managing the digital OTT platform on behalf of the content provider. To enable reception of inputs and provide outputs to the system 200, the I/O module 206 may include at least one input interface and/or at least one output interface. Examples of the input interface may include, but are not limited to, a keyboard, a mouse, a joystick, a keypad, a touch screen, soft keys, a microphone, and the like. Examples of the output interface may include, but are not limited to, a display such as a light emitting diode display, a thin-film transistor (TFT) display, a liquid crystal display, an active-matrix organic light-emitting diode (AMOLED) display, a microphone, a speaker, a ringer, and the like. In an example embodiment, at least one module of the system 200 may include an I/O circuitry (not shown in FIG. 1) configured to control at least some functions of one or more elements of the I/O module 206, such as, for example, a speaker, a microphone, a display, and/or the like. The processing module 202 of the system 200 and/or the I/O circuitry may be configured to control one or more functions of the elements of the I/O module 206 through computer program instructions, for example, software and/or firmware, stored on a memory, for example, the memory module 204, and/or the like, accessible to the processing module 202 of the system 200.

In at least some embodiments, the operator of the system 200 may use the I/O module 206 to provide inputs to train the machine learning model stored in the memory module 204. For example, the operator of the system 200 may provide inputs related to a plurality of image portions and corresponding encoding profiles preferred by various viewers for viewing content, to the machine learning model. The inputs provided to the machine learning model may also include information related to a playback quality experienced by a viewer after a selection of a particular encoding profile. The machine learning module is trained using such inputs to accurately determine and assign a tag for improved encoding of corresponding image portions given viewer preference (e.g., based on online viewer behavior) and a set of user/network attributes. The operator of the system 200 may also use the I/O module 206 to tune the weights of parameters of the machine learning model. More specifically, viewer behavior data including data related to the plurality of content viewers may be used to train a machine learning model. In various examples, the viewer behavior data may include information related to online behavior patterns, network attributes, age, gender, location, network provider, access patterns, content genre preferences, language preferences, and the like related to the plurality of content viewers. Particularly, the machine learning model can be configured to classify the plurality of content viewers that share similarities with each other into different categories or viewer cohorts based on the viewer behavior data. In other words, the machine learning model is configured to generate a plurality of viewer cohorts based, at least in part, on the viewer behavior data. The term 'viewer cohort' refers to a group of content viewers that share similar behavior and network attributes. To that end, the content viewers present within the same cohort share various other similarities such as demographic, location, bandwidth, similar electronic devices with each other, and the like. In various non-limiting examples, the machine learning model can be a classification or sorting type machine learning model.

The communication module 208 is configured to facilitate communication between the system 200 and other components of the digital platform server (not shown in FIG. 2). In some embodiments, the communication module 208 may be configured to facilitate communication between the system 200 and one or more remote entities over the communication network 110 (shown in FIG. 1). For example, the communication module 208 is capable of facilitating communication with electronic devices of content viewers, with ISPs, with edge servers associated with CDNs, with content ingestion servers, and the like.

The storage module 210 is any computer-operated hardware suitable for storing and/or retrieving data. In one embodiment, the storage module 210 is configured to store classification rules, tag information, encoding profiles for different tags, playback event logs for a plurality of users, reconstruction rules/policies, and the like. The storage module 210 may include multiple storage units such as hard drives and/or solid-state drives in a redundant array of inexpensive disks (RAID) configuration. In some embodiments, the storage module 210 may include a storage area network (SAN) and/or a network attached storage (NAS) system. In one embodiment, the storage module 210 may correspond to a distributed storage system, wherein individual databases are configured to store custom information, such as user playback event logs.

In some embodiments, the processing module 202 and/or other components of the content encoder 214 may access the storage module 210 using a storage interface (not shown in FIG. 2). The storage interface may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing the processing module 202 and/or the media encoder 212 with access to the storage module 210.

The various components of the system 200, such as the processing module 202, the memory module 204, the I/O module 206, the communication module 208 and the storage module 210 are configured to communicate with each other via or through a centralized circuit system 212. The centralized circuit system 212 may be various devices configured to, among other things, provide or enable communication between the components of the system 200. In certain embodiments, the centralized circuit system 212 may be a central printed circuit board (PCB) such as a motherboard, a main board, a system board, or a logic board. The centralized circuit system 212 may also, or alternatively, include other printed circuit assemblies (PCAs) or communication channel media.

In at least one example embodiment, the communication module 208 is configured to receive streaming content such as video content from a remote source, such as a content ingestion server associated with the content provider that may be configured to ingest the video content from multiple sources. The term 'streaming content' is explained hereinafter with reference to streaming of video content, but it is understood that the content may include any type of multimedia content, such as gaming content, audio content, audio-visual content, etc.

In some embodiments, system 200 is associated with a database 218. The database 218 may be integrated within the storage module 210 as well. For example, the storage module 210 may include one or more hard disk drives as the database 218. It is understood that the media content received from the content ingestion server may correspond to a livestreaming content or video-on-demand content. In a non-limiting example, the media content such as media content 220 may be stored in the database 218 associated with the system 200. In one embodiment, the media content 220 may correspond to a video received from an image capture device, such as a camera. The received media content 220 may include a plurality of image frames and a plurality of audio frames, for example, a sequence of image frames and a sequence of audio frames. In addition to the main playback content, in some example embodiments, the plurality of image frames that are received related to the media content 220 may include image frames capturing content captured from multiple camera angles of the same scene or different picture exposure options. Similarly, in other example embodiments, the plurality of audio frames that are received related to the media content 220 may include audio frames capturing content captured from multiple audio sources within the same environment where the plurality of image frames are captured.

As such, a scene of the media content 220 may have multiple captures or in simple terms 'multiple image frames' that can be provisioned for the content viewer 102 at the same instant. In one illustrative example, an action thriller movie may include a scene in which an actor pursued by two different groups of people is seen hanging precariously from a cliff and may be captured from different camera angles, for example, a first camera angle in which a first group of people are seen trying to help the actor and a second camera angle in which the second group of people are trying to push the actor down the cliff. Information related to multiple camera angles for a scene may be referred to herein as 'camera metadata' and may be received as part of the media content 220. For example, sets of image frames that correspond to one scene are arranged in parallel and information such as number of such sets, number of image frames in each set, brief description related to each set (e.g., cast, plot, angle information, exposure information, etc.) and the like, configure the camera metadata, which may be received as part of the video content in some cases.

In some example embodiments, the communication module 208 also receives online viewer behavior related to a viewer. The term 'online viewer behavior' as used herein primarily refers to characteristics or attributes of an individual viewer and may include information related to historical data related to past media content views, social media interactions, viewer audio preference, viewer audio experience, viewer preferences, and the like. Additionally, the online viewer behavior may also include personal information of the content viewer (e.g., name, age, gender, nationality, e-mail identifier and the like), cart information, URLs, transaction information such as, payment history, call logs, chat logs and the like. Such information may be received from web servers hosting and managing third-party websites, remote data gathering servers tracking viewer activity on a plurality of enterprise websites, a plurality of interaction channels (for example, websites, native mobile applications, social media, etc.) and a plurality of devices. In addition, the online viewer behavior may also include the viewer metadata received along with the request for playback URL such as, device identifier, IP address, geo-location information, browser information, time of the day, chat logs, device identifiers, user profiles, messaging platforms, social media interactions, user device information such as, device type, device operating system (OS), device browser, browser cookies, and the like along with subscriber information such as, age group, gender, language preference, content preference, cast preference and any other preference of the viewer provided as a part of registration.

The communication module 208 may be configured to forward such inputs (e.g., the media content 220 and the online viewer behavior data) to the processing module 202, or more specifically, to the content encoder 214. The content encoder 214 in conjunction with the instructions stored in the memory module 204 is configured to process such inputs (e.g., the media content 220 and the online viewer behavior data) to generate a media rendition record. The processing performed by the content encoder 214 is explained next with reference to FIG. 3.

Figure 3:
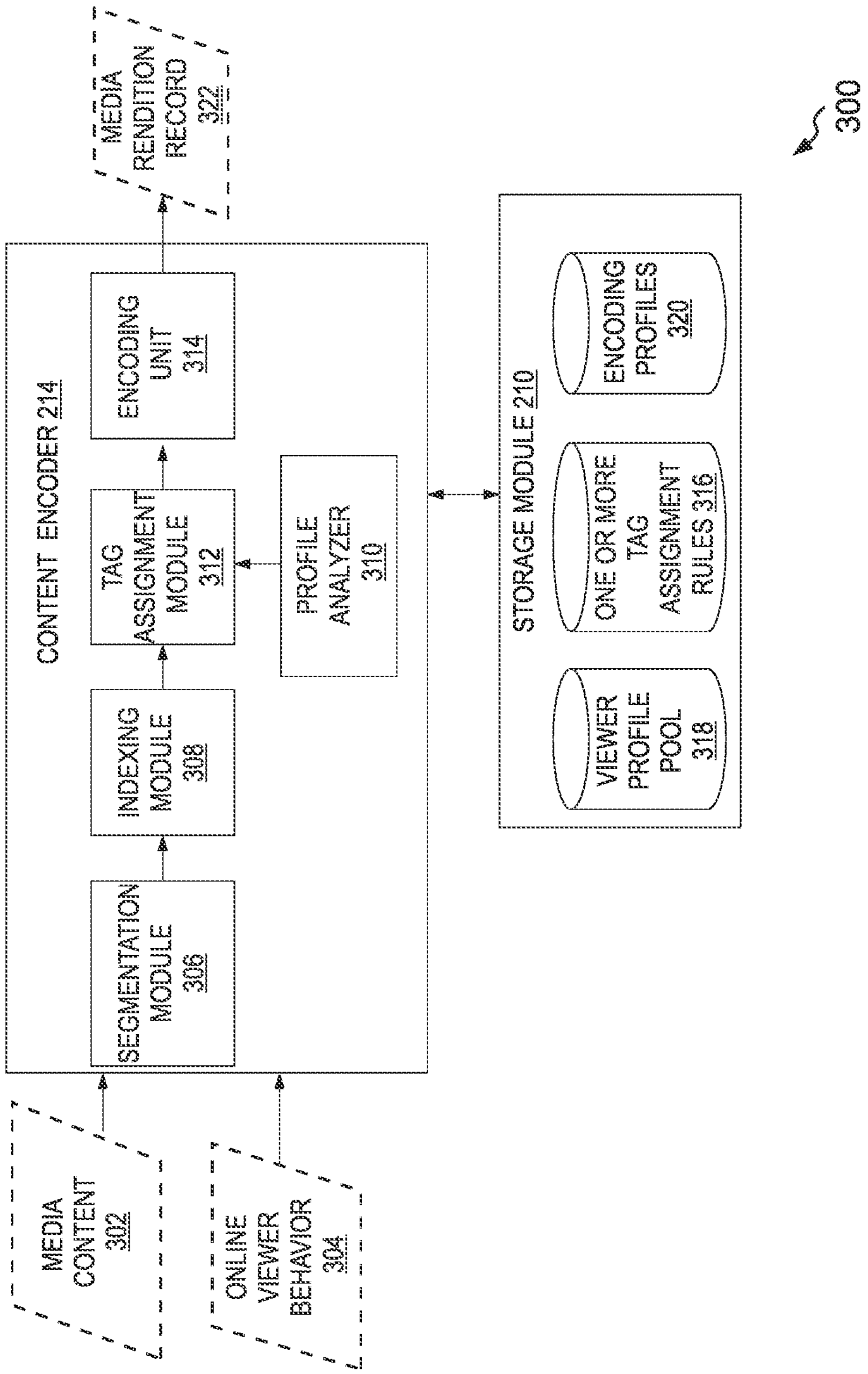
FIG. 3 is a block diagram representation for illustrating processing of the media content by a content encoder, in accordance with an embodiment of the invention.

FIG. 3 is a block diagram representation 300 for illustrating processing of a media content 302 by the content encoder 214 of FIG. 2, in accordance with an embodiment of the invention. More specifically, the block diagram representation 300 shows improved encoding of the media content 302 for generating a media rendition record 322. The content encoder 214 includes a segmentation module 306, an indexing module 308, a profile analyzer 310, a tag assignment module 312, and an encoding unit 314.

As explained with reference to FIG. 2, the communication module 208 is configured to receive the media content 302 from a content ingestion server or a content library. The media content 302 includes a sequence of a plurality of image frames. The content encoder 214 within the processing module 202 may be configured to process the media content 302 to facilitate improved encoding of the media content. The content encoder 214 processes the media content on a frame-by-frame basis and hence processing of a media content is explained with reference to an image frame, e.g. a single image frame of the media content. It is understood that other image frames related to the media content may similarly be processed and encoded in a sequential manner. In addition, the communication module 208 also receives the online viewer behavior 304.

Accordingly, the segmentation module 306 of the content encoder 214 is configured to receive an image frame and an audio frame of the media content 302. The segmentation module 306 is configured to partition the image frame into a plurality of image portions. Further, the segmentation module 306 is configured to partition the audio frame into a plurality of audio portions. In other words, the image frame is broken down into various subgroups called image portions that capture different objects in the image frame. Similarly, the audio frame is broken down into various subgroups called audio portions that capture different audio sources within an audio frame of the media content 302. It is noted that the segmentation of image frames can be done based on the viewer cohorts as well. For example, for a viewer cohort including viewers with high bandwidth, the number of image portions generated may be low. On the other hand, for another viewer cohort including viewers with low bandwidth, the number of image portions generated may be higher. In one embodiment, the image frame is segmented into image portions including foreground objects and image portions including background objects. In one illustrative example, similarity detection may be used to group pixels of foreground objects that are similar and pixels of background objects that are similar may be grouped together to form image portions. In another illustrative example, discontinuity detection may be utilized to segment the foreground and background objects into different image portions in the image frame. For example, if an image frame $I_1$ depicts three kids playing in a park, the foreground objects may correspond to the three kids and as such, three image portions $P_1$, $P_2$, $P_3$ corresponding to the three kids are segmented. Similarly, the background objects may correspond to play instruments (e.g., swing, slide, monkey bars), trees, sky, bushes, and the like and may be segmented into 5 image portions $P_4$, $P_5$, $P_6$, $P_7$, $P_8$. As such, the image frame $I_1$ may be segmented to form 8 image portions $P_1$, $P_2$, $P_3$, $P_4$, $P_5$, $P_6$, $P_7$, and $P_8$. Some examples of image segmentation techniques include but not limited to threshold method, edge based segmentation, region based segmentation, clustering based segmentation, watershed based method and artificial neural network based segmentation. A similar process may be done for the audio frame segmentation as well. The plurality of image portions in relation to the image frame is sent to the indexing module 308.

The indexing module 308 in conjunction with the instructions in the memory module 204 is configured to generate a portion identifier (e.g., a sequence number) for each image portion in the image frame. More specifically, the sequence number for an image portion is based on a position of the image portion in the image frame. In an illustrative example, the image portion $P_1$ is associated with a sequence number '001' indicating that $P_1$ is a first image portion among the image portions ($P_1$, $P_2$, $P_3$, $P_4$, $P_5$, $P_6$, $P_7$, and $P_8$) related to the image frame. Similarly, the image portion $P_2$ is associated with a sequence number '002', the image portion $P_3$ is associated with a sequence number '003', and so on. It is noted that a three digit representation of the sequence numbers is shown for illustration purposes and that the sequence number for an image portion may be represented in different ways, for example, using alphabets, using numbers or any combination of the above, to depict an order or exact sequence of the image portions. Similarly, another sequence number for each audio portion in the audio frame. In various examples, the sequence number for an image portion or an audio portion may be stored within a data structure such as an array, a linked list, and the like. Further, as may be understood indexing the image portions ensures that an order of image portions in the image frame does not get scrambled when reconstructed or combined together after encoding, as will be explained in further detail later.

The profile analyzer 310 in conjunction with the instructions in the memory module 204 is configured to classify each viewer into a cohort based on the online viewer behavior and accordingly, different image portions are encoded at different resolutions and/or bit rates for different cohorts of viewers. The term 'cohort' as used herein refers to a group of viewers accessing the same or similar streaming content on respective devices at the same time period and share same or similar online viewer behavior for example, requested media content, cast preferences, genre preferences, gender, age group, network provider, etc. The profile analyzer 310 may access profiles of viewers from the viewer profile pool 318 of the storage module 210 to identify a cohort for a viewer such as, the content viewer 102. In one embodiment, the profile analyzer 310 may utilize a machine learning model for classifying each viewer into a viewer cohort based, at least in part, on the viewer behavior data.

The tag assignment module 312 is configured to utilize the machine learning model to assign a tag for each image portion in the image frame. In at least one example embodiment, the tag assignment module 312 is configured to assign a tag for each image portion based, at least in part, on the cohort of the viewer (i.e., the viewer cohort) and the one or more tag assignment rules 316. As may be understood, the one or more tag assignment rules 316 are predefined rules that define a resolution and bit rate at which either or both the corresponding image portions or the corresponding audio portions can be encoded for content viewers belonging to a particular viewer cohort. This encoding at the defined resolution and bit rate is done such that content viewers are able to stream the corresponding image or corresponding audio portions easily, i.e., without any buffering or jittering while also reducing the processing resources required at viewer's end (on viewer device) for reconstructing or decoding the media rendition record. As may be understood, the one or more tag assignment rules 316 ensures that each viewer cohort is served with media content that they are capable of viewing. For example, a first tag assignment rule may define that a viewer cohort for a set of content viewers that have higher end devices with high bandwidth may be served with media content encoded with a high resolution and high bit rate. On the other hand, a second tag assignment rule may define another viewer cohort for another set of content viewers that have lower end devices and poor bandwidth may be served with the same media content encoded with a low resolution and low bit rate More specifically, the tag is configured to serve as an identifier capable of indicating a resolution and bit rate at which either or both the corresponding image portions or the corresponding audio portions have to be encoded by the encoding unit 314. The standard resolutions and the bit rates are usually stored as encoding profiles 320 in the storage module 210 and the assigned tags may include a resolution value or bitrate based on the encoding profiles 320.

For example, each cohort may prefer or appreciate certain image portions in an image frame that is determined based on the online viewer behavior and as such, the resolution and/or bit rate of such image portions are to be encoded at high values that are indicated by the tag. In one illustrative example, viewers of a live political campaign from a location (e.g., village A) in the age group of 20-30 are likely to keenly follow an appearance of the political leader while delivering a speech and accordingly, image portions corresponding to the political leader are encoded at high resolution for this cohort of viewers. Alternatively, viewers of the live political campaign in the age group of 30-40 from a city keenly show interest in the election manifesto displayed beside the political leader while delivering a speech and accordingly, image portions corresponding to the election manifesto may be encoded at high resolution for this cohort of viewers. In another example illustration, the online viewer behavior may indicate that a teenage person (i.e., the content viewer 102) has been viewing educational websites to explore wildlife and collect wildlife-related content. When such a viewer requests streaming of a wildlife documentary, image portions corresponding to animals encoded at higher resolution may be provided for the cohort of viewers. Moreover, the one or more tag assignment rules 316 stored in the storage module 210 that ensure a change in resolution and/or bit rate across image portions and audio portions is gradual and not abrupt to create a patchy image frame when displayed. To that effect, the one or more tag assignment rules 316 includes a plurality of assignment rules that define the assignment of tags for neighboring image portions in the image frame. In various embodiments, the one or more tag assignment rules 316 may include a plurality of predefined rules defining how to encode media content from different media sources (such as different production houses, studios, directors and the like), different aspect ratios and the like for each of the plurality of viewer cohorts.

In one illustrative example, image portions that are adjacent in an image frame I1 are not assigned resolutions and/or bit rates that greatly differ, for example, image portion P4 is assigned a tag T4 indicating a resolution of 360p and bitrate of 3 kbps for encoding the background objects in the image portion P4 and the image portion P5 is assigned a tag T5 indicating a resolution of 480p and a bitrate of 3 kbps for encoding the background objects in the corresponding image portion P5. In another illustrative example, image portion P1 depicting a foreground object may be assigned a tag T2 indicating that the image portion P1 may be encoded at a resolution of 720p whereas image portion P4 depicting a background object is assigned a tag T4 indicating encoding of the image portion P4 at a resolution of 360p. For example, a foreground image portion be assigned a higher resolution while a background image portion may be assigned a lower resolution. An example of assigning tags to different image portions in an image frame of media content is shown and explained next with reference to FIG. 4. In other words, different image and audio portions can be assigned different resolutions and bitrates.

Figure 4:
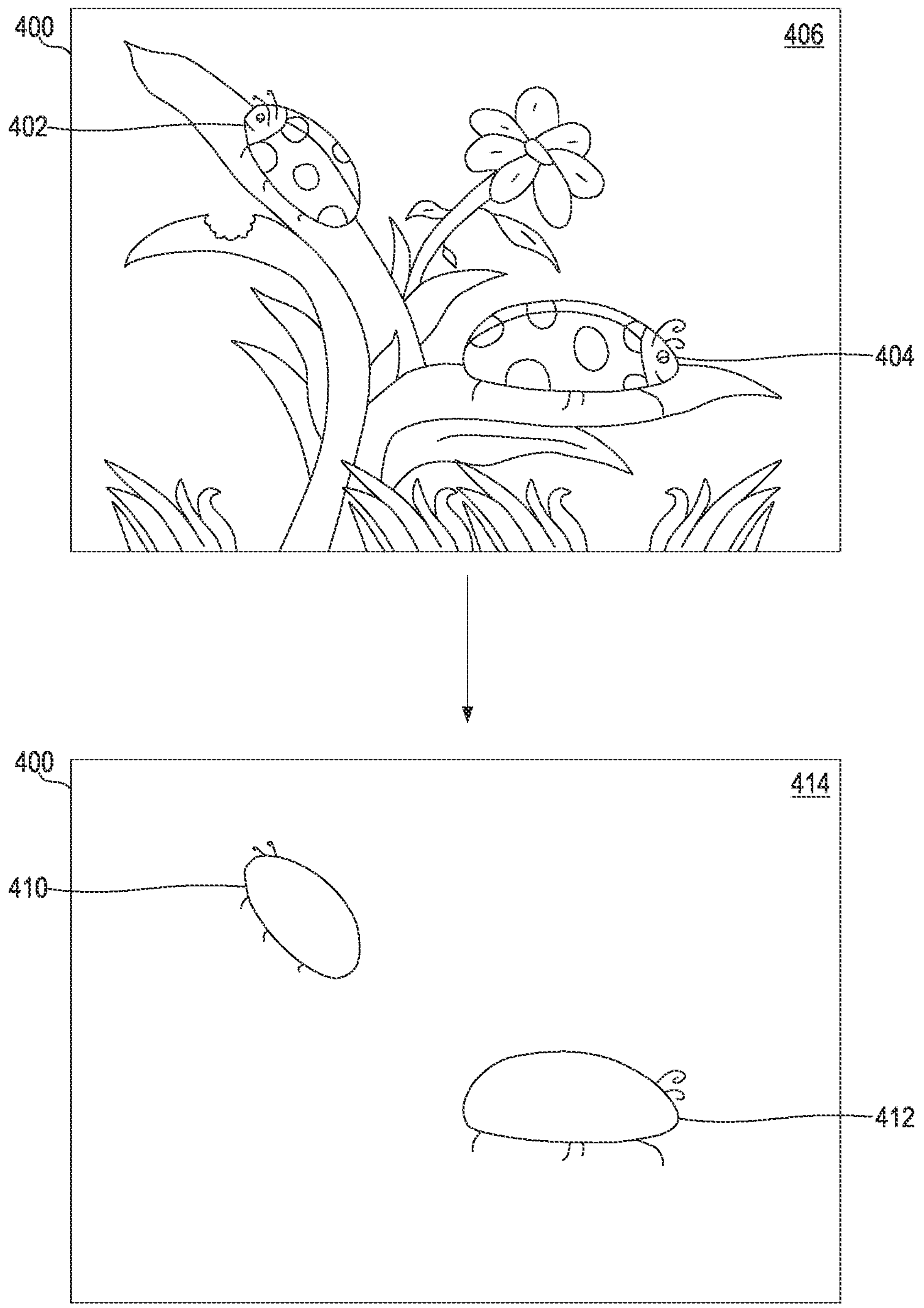
FIG. 4 is a schematic representation illustrating an example for assigning tags for different image portions of an image frame, in accordance with an embodiment of the invention.

FIG. 4 is a schematic representation illustrating an example for assigning tags for different image portions of an image frame 400, in accordance with an embodiment of the invention.

As already explained, the image frame 400 is segmented into a plurality of image portions. For example, the ladybugs in the image frame 400 are classified as foreground objects 402 and 404, whereas the flower and grass in the image frame 400 are classified as background objects 406. As such, the image frame 400 may be segmented into three different image portions, for example, an image portion depicting the foreground object 402, an image portion depicting the foreground object 404, and an image portion depicting the background objects 406. It shall be noted that the segmentation of the image frames is shown for example purposes only and the image frame 400 may be segmented into fewer or more number of image portions. For example, the background objects 406 in the image frame 400 may be split into three different image portions depicting, the grass, the flower, and the lawn. Further, it shall be noted that the image portions may be of different shapes, sizes, or symmetries to capture respective foreground or background objects in the image frame. Further, the image portions may be replaced with targeted content such as advertisements that can vary in time and according to the viewer cohort based on the user's preferences. It is noted that the targeted content including targeted content portions can be stored within the database 218 associated with the system 200 (not shown). In other words, at first, targeted content for a content viewer (e.g., the content viewer 102) is determined based, at least in part, on the viewer cohort or viewer behavior data and then, one or more image portions may be replaced with the targeted content in the median rendition record. More specifically, the targeted content portions are accessed from the database 218, and one or more image portions from the plurality of image portions are replaced with the targeted content portions.

As already explained, different image portions in the image frame 400 may be assigned a tag based, at least in part, on the cohort of the viewer and one or more tag assignment rules. In one illustrative example, a viewer of the media content 302 including the image frame 400 may be a nature enthusiast as determined based on the online viewer behavior related to the viewer. As such, the image portions 410 and 412 corresponding to the foreground objects 402 and 404 are assigned a tag T1 and the image portion 414 corresponding to the background object 406 is assigned a tag T2. These tags indicate a resolution and/or bit rate at which the encoder has to encode these objects i.e., the image portions 410, 412, and 414 in the image frame 400. For example, the tag T1 assigned to image portions 410 and 412 may indicate that the foreground objects 402 and 404 (i.e., the image portions 410 and 412) have to be encoded at a resolution of 1080p at a bitrate of 15 Mbps and the tag T2 assigned to image portion 414 may indicate that the background object 406 shall be encoded at 720p at a bitrate of 6 Mbps. In other words, finer details (i.e., high-resolution version) of image portions 410 and 412 may be encoded based on tag T1 whereas the image portion 414 may be encoded at a relatively lower resolution and/or bitrate to reduce bandwidth consumptions. In general, different image portions in the image frame 400 are encoded at different resolutions and/or bitrates to ensure sub-optimal limits on the quality of streaming media content which adapts gracefully to fluctuating mobile networks and consumes lesser bandwidth. These tags indicate to the encoder the resolution and/or bit rate required for each image portion to generate a media rendition record as will be explained later.

Referring now to FIG. 3, the image portions of the image frame 400 are provided along with corresponding tags and sequence numbers to the encoding unit 314 which encodes the image frame. The encoding unit 314 is configured to convert the media content (i.e., the plurality of image frames) into a format capable of being streamed to subscribers or content viewers. In general, the encoding unit 314 is configured to encode the media content 302 to generate encoded media content that may include a stream of encoded image portions. More specifically, the image frame 400 is encoded based on the tag assigned for each image portion in the image frame 400 to generate an encoded image frame. As the tags associated with the plurality of image portions are different, the image portions in the image frame 400 may be encoded at different resolutions and/or different bit rates by the encoding unit 314. Some examples of encoding techniques used by the encoding unit 314 include, but not limited to, Alternate Bitrate Streaming (ABR) technique, HTTP Streaming (HTTPS), Dynamic Adaptive Streaming over HTTP (DASH), HTTP Live Streaming (HLS), HTTP Dynamic Streaming (HDS), and the like.

Similarly, the plurality of image frames in the media content 302 are encoded based on corresponding tags to generate the stream of encoded image portions that may be provided to electronic devices of subscribers. Such encoding of image frames in the media content based on the assigned tag drastically reduces bandwidth and processing requirements of electronic devices of the subscribers and also provides memory savings while the encoding ensures gradual adaptation of resolutions and/or bitrates of image portions in the image frame 302.

In at least one example embodiment, the encoding unit 314 is further configured to generate a media rendition record 322 corresponding to the media content 302. The media rendition record 322 includes the encoded media content (i.e., stream of encoded image portions) and at least one of a sequence number for each image portion in an image frame and another sequence number for each audio portion in an audio frame. For example, the media rendition record 322 is similar to a manifest and includes information related to streaming the media content such as, but not limited to, number of image frames in the media content, number of image portions in each image frame, stream of encoded image portions, and sequence number for each image portion in an image frame, and the like. In an alternate example, the encoding unit 314 of the system 200 may generate an updated manifest such that the manifest includes the media rendition record 322. As may be understood, conventionally manifest files include a plurality of encoding ladders corresponding to uniform resource locators (URLs) of the same media content with a plurality of different resolutions and/or bitrates. As described earlier, maintaining different renditions of the same media files at CDNs is resource expensive and leads to a wastage of resources since not every user can support higher-end resolutions and/or bit rates. Therefore, if the media rendition record 322 is added to the manifest file instead of the entirety of the encoding ladder, then storage resources can be saved. As may be understood, when a media rendition record 322 is available for the content viewer 102, the likelihood of the content viewer 102 to access media content through different encoding ladders is reduced. Therefore, the updated manifest can include fewer or no separate encoding ladders for the media content due to the presence of the media rendition record 322. It is noted that now since fewer or no encoding ladders are included in the manifest, there exists no need for the CDN to cache the media content at different resolutions and bitrates of these non-existing encoding ladders. In other words, the CDN maintains a copy or caches the media rendition record along with maybe a few other encoding ladders. Further, the media rendition record 322 may be stored in a CDN for example, the CDN 108*a* (shown in FIG. 1). When a viewer requests streaming of a media content 302 from the CDN, the media rendition record corresponding to the media content at may be provided to the electronic device of the viewer.

During streaming, the application corresponding to at least one content provider on the electronic device, for example, the application 106 on the electronic device 104 is configured to parse the media rendition record 322 for reconstructing the encoded media content. More specifically, the plurality of image portions corresponding to an image frame may be rearranged based on the sequence numbers assigned to the image portions to reconstruct the image frame. Similarly, the plurality of image frames is reconstructed sequentially at the electronic device 104 based on sequence numbers assigned to the image portions providing a seamless experience of watching the media content 302. Again, similarly, the plurality of audio portions corresponding to an audio frame may be rearranged based on the sequence numbers assigned to the audio portions to reconstruct the audio frame. To that end, the plurality of audio frames is reconstructed sequentially at the electronic device 104 based on sequence numbers assigned to the audio portions providing a seamless experience of watching the media content 302. In other words, the application 106 on the electronic device 104 is configured to parse the corresponding media rendition record to decode the encoded media content corresponding to the determined viewer cohort based, at least in part, on the set of image sequence numbers. In an alternative or additional embodiment, the encoded image frames are reconstructed by the system 200 based on the sequence number prior to sending the encoded media content to the CDN. As may be understood, this aspect acts as a fallback mechanism for content viewers whose electronic devices are not able to parse the encoded image frames or the encoded audio frames on their own due to a variety of reasons. In such cases, the viewer may receive the media rendition record 322 which includes only the encoded media content e.g., stream of encoded image frames.

Referring now to FIG. 2, in some example embodiments, the communication module 208 is configured to receive the camera metadata and forward the camera metadata to the content customization module 216. The content customization module 216 in conjunction with the instructions stored in the memory module 204 is configured to personalize the media content 302 for the viewer. More specifically, the content customization module 216 may process the online viewer behavior to dynamically display image frames from different camera angles based on the online viewer behavior (i.e., viewer behavior data). In one illustrative example, the viewer may be an ardent fan of a team (e.g., Team A) that is competing against two other teams (e.g., Team B and Team C) in a reality adventure game. Most often, when teams compete against each other, video content corresponding to one team may be shown at a time instant i.e., all teams may not be captured in one single frame. In such cases, when the viewer prefers to view the performance of his favorite team, the content customization module 216 is configured to select a set of image frames that correspond to the favorite team of the viewer from among the sets of image frames corresponding to different teams based on the online viewer behavior. Accordingly, the system 200 personalizes the media content based on viewing preferences of the viewer. In some example embodiments, the viewer may be presented with options (not shown) to view the different camera angles of the same scene when the video content is streamed. For example, the viewer may swipe to the right/left or use hand gestures to automatically change the viewing angle of the viewer i.e., change from viewing one set of image frames related to a camera angle to another set of image frames related to a different camera angle. In some example embodiments, the content customization module 216 may also stitch together image frames from different camera angles into one image frame such as, a panoramic image frame and the viewer may swipe to view different camera angles while streaming such panoramic image frames. An example of encoding media content for content viewers in an optimal way is explained next with reference to FIGS. 5-7B.

Figure 5:
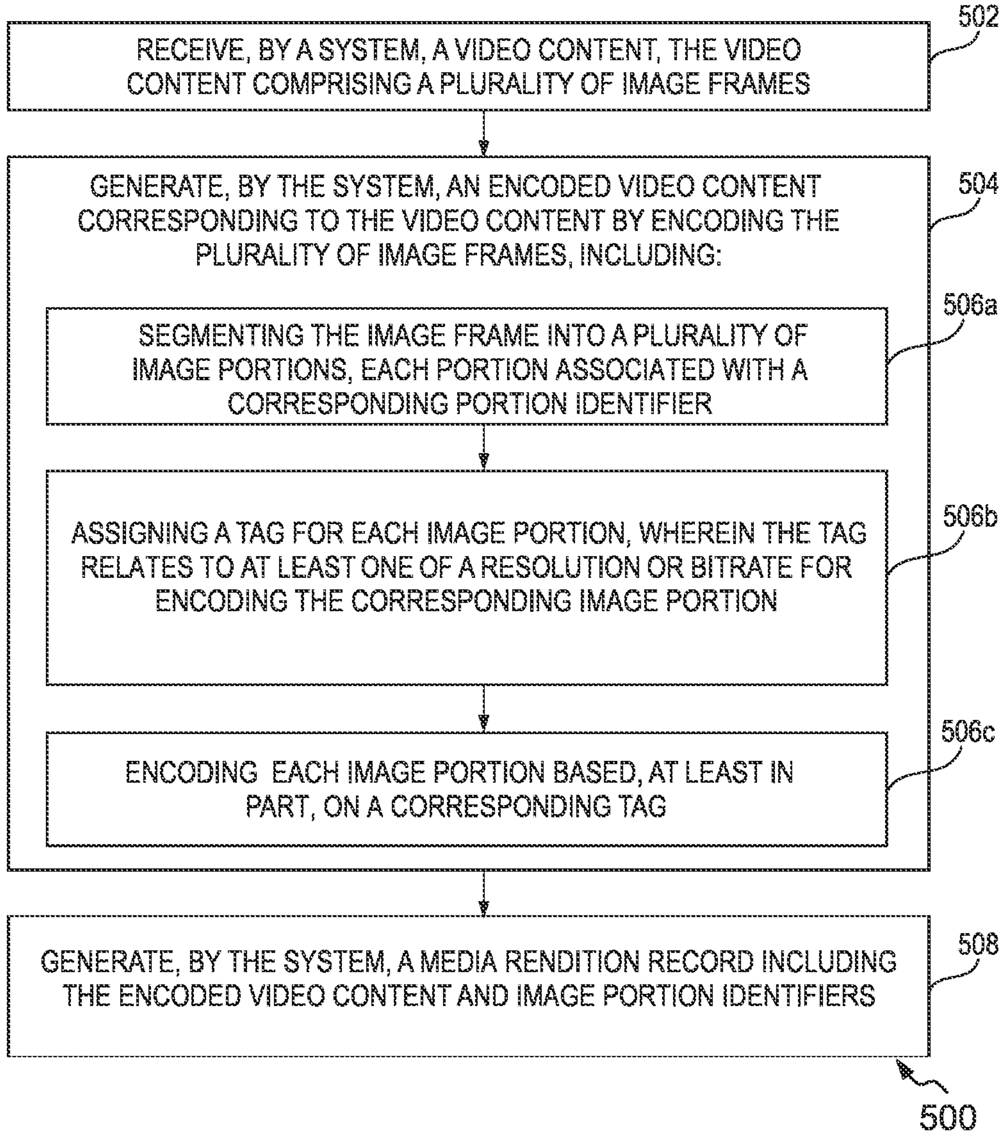
FIG. 5 shows a flow diagram of a method for improved encoding of media content for content viewers, in accordance with an embodiment of the invention.

FIG. 5 shows a flow diagram of a method 500 for improved encoding of media content for content viewers, in accordance with an embodiment of the invention. The various steps and/or operations of the flow diagram, and combinations of steps/operations in the flow diagram, may be implemented by, for example, hardware, firmware, a processor, circuitry and/or by a system such as the system 200 explained with reference to FIGS. 1 to 4 and/or by a different device associated with the execution of software that includes one or more computer program instructions. The method 500 starts at operation 502.

At operation 502 of the method 500, media content is received by a system, such as the system 200 explained with reference to FIGS. 1 to 4. The media content includes a plurality of image frames.

At operation 504 of the method 500, an encoded media content is generated corresponding to the media content by encoding the plurality of image frames. An image frame from the plurality of image frames is encoded by performing the steps 506*a* to 506*c*.

At operation 506*a* of the method 500, the image frame is segmented into a plurality of image portions. Further, each image portion is indexed with a sequence number.

At operation 506*b* of the method 500, a tag is generated for each image portion of the plurality of image portions based, at least in part, on analysis of corresponding image portion and a tag assignment policy. The tag includes information related to at least a resolution and bitrate for encoding the corresponding image portion. It is noted that in some examples, the tag assignment policy may include one or more tag assignment rules.

At operation 506*c* of the method 500, the each image portion of the plurality of image portions is encoded based, at least in part on, corresponding tags.

At operation 508 of the method 500, a media rendition record comprising the encoded media content and sequence numbers for the plurality of image portions related to each image frame is generated. The sequence numbers associated with the plurality of image portions are used to reconstruct the image frame. Further, the media rendition record is sent to a content delivery network (CDN).

Figure 6:
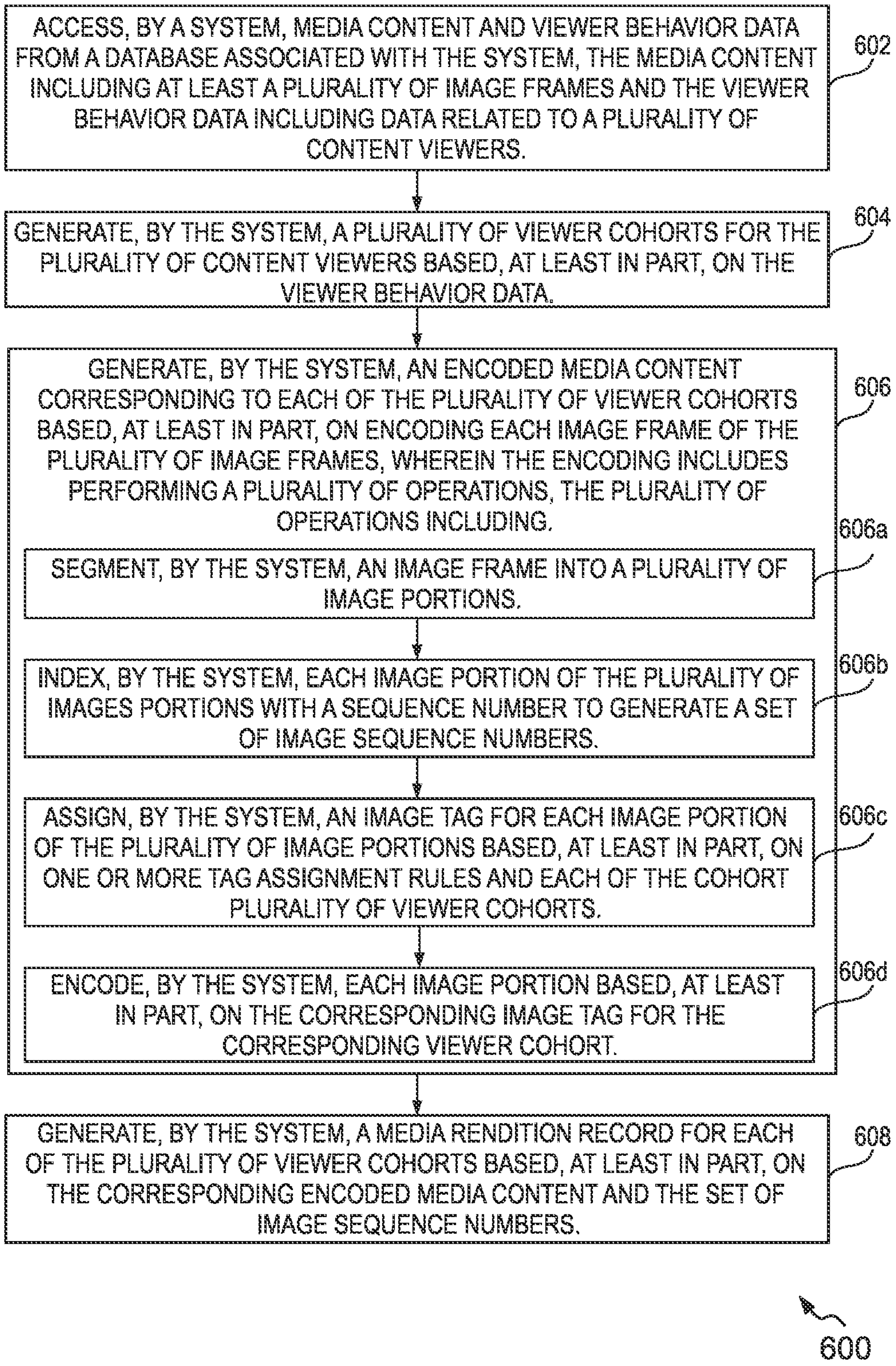
FIG. 6 shows a flow diagram of a method for optimally encoding media content for content viewers, in accordance with another embodiment of the invention.

FIG. 6 shows a flow diagram of a method 600 for optimally encoding media content for content viewers, in accordance with another embodiment of the invention. The various steps and/or operations of the flow diagram, and combinations of steps/operations in the flow diagram, may be implemented by, for example, hardware, firmware, a processor, circuitry and/or by a system such as the system 200 explained with reference to FIGS. 1 to 4 and/or by a different device associated with the execution of software that includes one or more computer program instructions. The method 600 starts at operation 602.

At operation 602 the method 600 includes accessing, by a system such as system 200, media content and viewer behavior data from a database associated with the system 200. The media content may include at least a plurality of image frames and the viewer behavior data may include data related to a plurality of content viewers.

At operation 604 the method 600 includes generating, by the system 200, a plurality of viewer cohorts based, at least in part, on the viewer behavior data. In an example, a machine learning model may be used to generate the plurality of viewer cohorts based, at least in part, on the viewer behavior data.

At operation 606 the method 600 includes generating, by the system 200, an encoded media content corresponding to each of the plurality of viewer cohorts based, at least in part, on encoding each image frame of the plurality of image frames. In one embodiment, the encoding process includes performing a plurality of operations illustrated at steps 606*a*-606*d*.

At operation 606*a* the method 600 includes segmenting, by the system 200, an image frame into a plurality of image portions.

At operation 606*b* the method 600 includes indexing, by the system 200, each image portion of the plurality of image portions with a sequence number to generate a set of image sequence numbers.

At operation 606*c* the method 600 includes assigning, by the system 200, an image tag for each image portion of the plurality of image portions based, at least in part, on one or more tag assignment rules and each of the plurality of viewer cohorts. Further, the image tag for each image portion of the plurality of image portions may also be assigned based, at least in part, on at least one of: (i) resolution and (ii) bitrate for the corresponding image portion At operation 606*d* the method 600 includes encoding, by the system 200, each image portion based, at least in part, on the corresponding image tag for the corresponding viewer cohort.

Figure 7A:
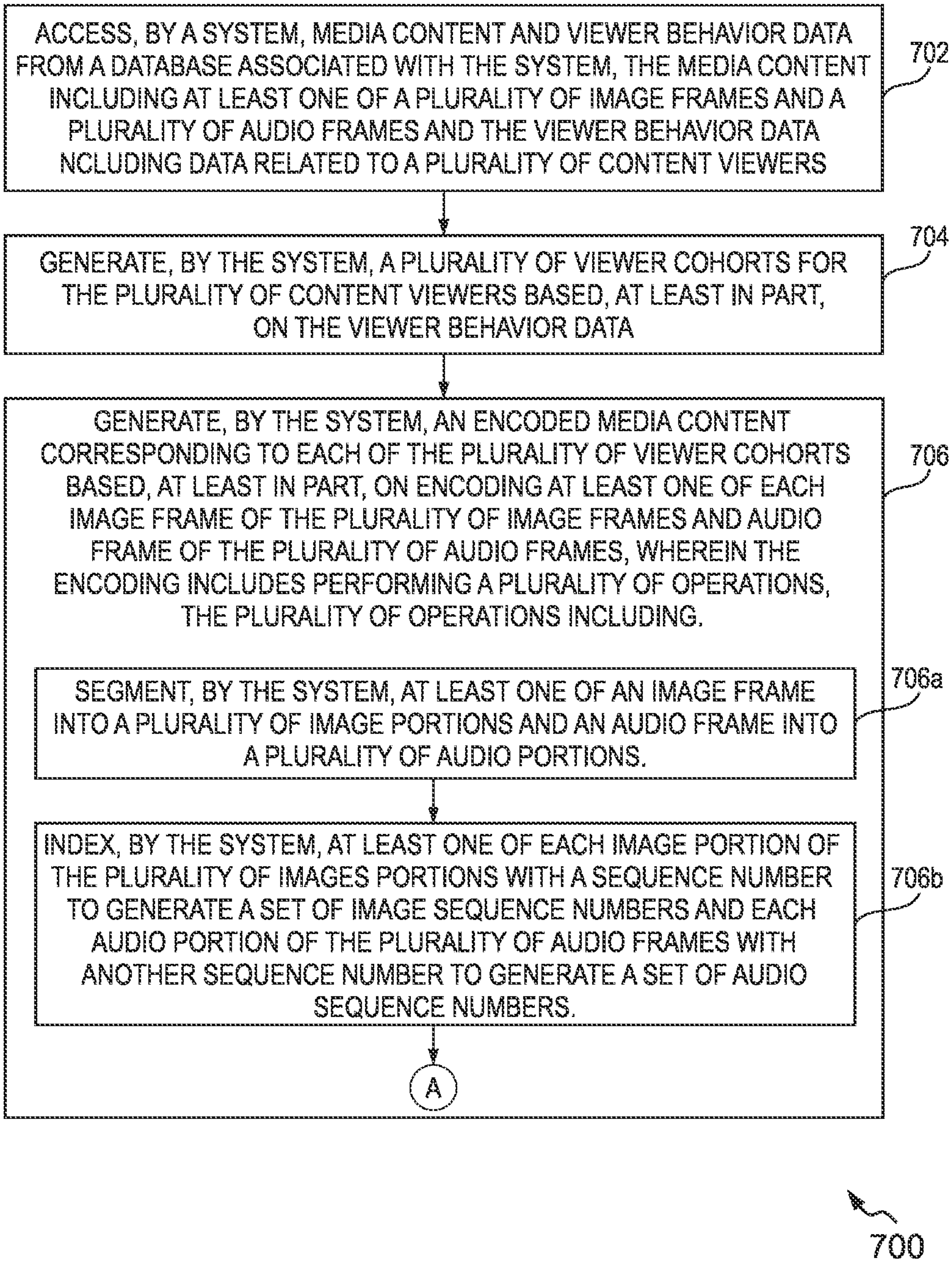
FIGS. 7A-7B, collectively, show a flow diagram of a method for optimally encoding media content for content viewers, in accordance with another embodiment of the invention.
Figure 7B:
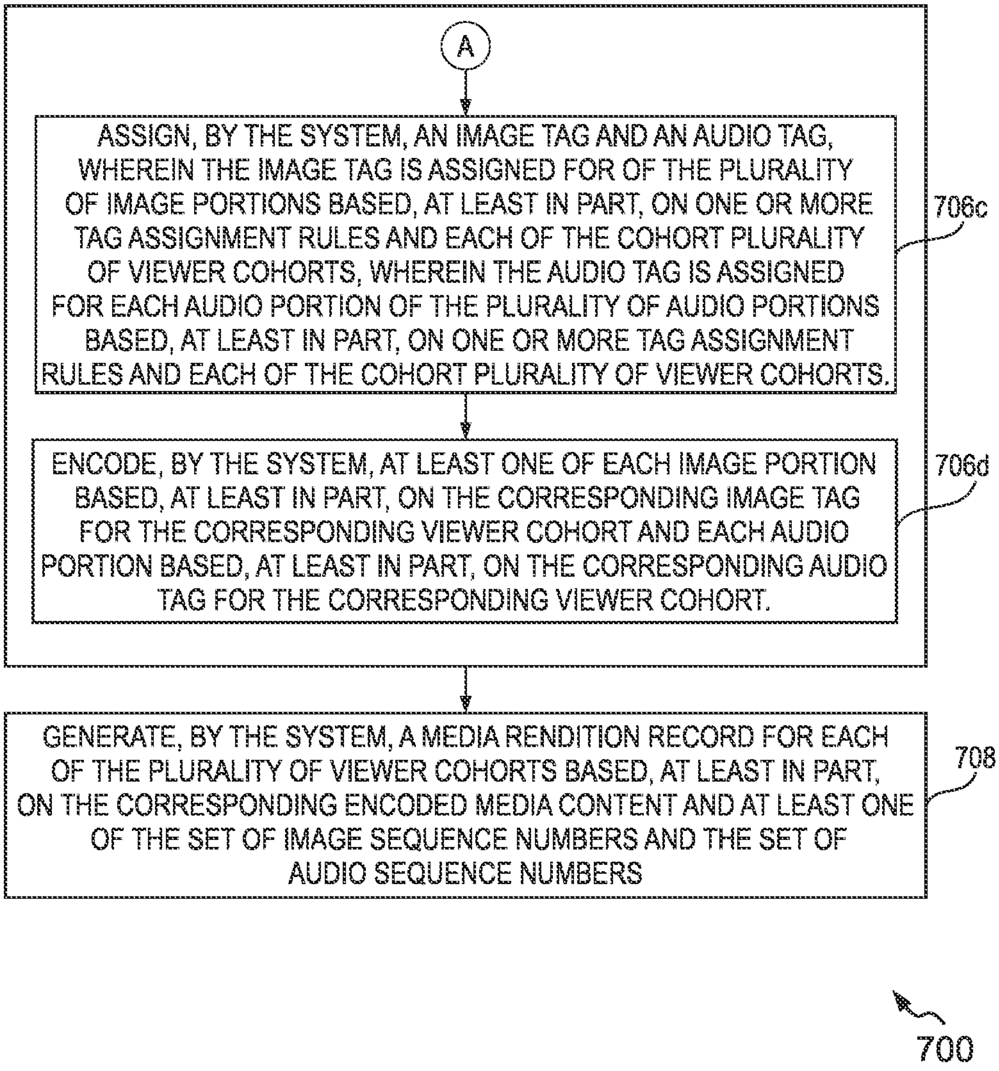

At operation 608 the method 600 includes generating, by the system 200, a media rendition record for each of the plurality of viewer cohorts based, at least in part, on the corresponding encoded media content and the set of image sequence numbers FIGS. 7A-7B, collectively, show a flow diagram of a method 700 for optimally encoding media content for content viewers, in accordance with another embodiment of the invention. The various steps and/or operations of the flow diagram, and combinations of steps/operations in the flow diagram, may be implemented by, for example, hardware, firmware, a processor, circuitry and/or by a system such as the system 200 explained with reference to FIGS. 1 to 4 and/or by a different device associated with the execution of software that includes one or more computer program instructions. The method 700 starts at operation 702.

At operation 702 the method 700 includes accessing, by a system such as system 200, media content such as media content 220 and viewer behavior data from a database such as database 218 associated with the system 200. The media content 220 may include at least one of a plurality of image frames and a plurality of audio frames and the viewer behavior data may include data related to a plurality of content viewers.

At operation 704 the method 700 includes generating, by the system 200, a plurality of viewer cohorts based, at least in part, on the viewer behavior data. In an example, a machine learning model may be used to generate the plurality of viewer cohorts based, at least in part, on the viewer behavior data.

At operation 706 the method 700 includes an encoded media content corresponding to each of the plurality of viewer cohorts based, at least in part, on encoding at least one of each image frame of the plurality of image frames and audio frame of the plurality of audio frames. In one embodiment, the encoding process includes performing a plurality of operations illustrated at steps 706*a*-706*d*.

At operation 706*a* the method 700 includes segmenting, by the system 200, at least one of an image frame into a plurality of image portions and an audio frame into a plurality of audio portions. It is understood that an audio frame can also be called an audio sample. In various examples, the plurality of audio portions may be of different audio bit rates.

At operation 706*b* the method 700 includes indexing, by the system 200, at least one of each image portion of the plurality of image portions with a sequence number to generate a set of image sequence numbers and each audio portion of the plurality of audio frames with another sequence number to generate a set of audio sequence numbers.

At operation 706*c* the method 700 includes assigning, by the system 200, an image tag and an audio tag, wherein the image tag is assigned for each image portion of the plurality of image portions based, at least in part, on one or more tag assignment rules and each of the cohort plurality of viewer cohorts, wherein the audio tag is assigned for each audio portion of the plurality of audio portions based, at least in part, on one or more tag assignment rules and each of the cohort plurality of viewer cohorts.

At operation 706*d* the method 700 includes encoding, by the system 200, at least one of each image portion based, at least in part, on the corresponding image tag for the corresponding viewer cohort and each audio portion based, at least in part, on the corresponding audio tag for the corresponding viewer cohort.

At operation 708 the method 700 includes generating, by the system 200, a media rendition record for each of the plurality of viewer cohorts based, at least in part, on the corresponding encoded media content and at least one of the set of image sequence numbers and the set of audio sequence numbers.

Figure 8:
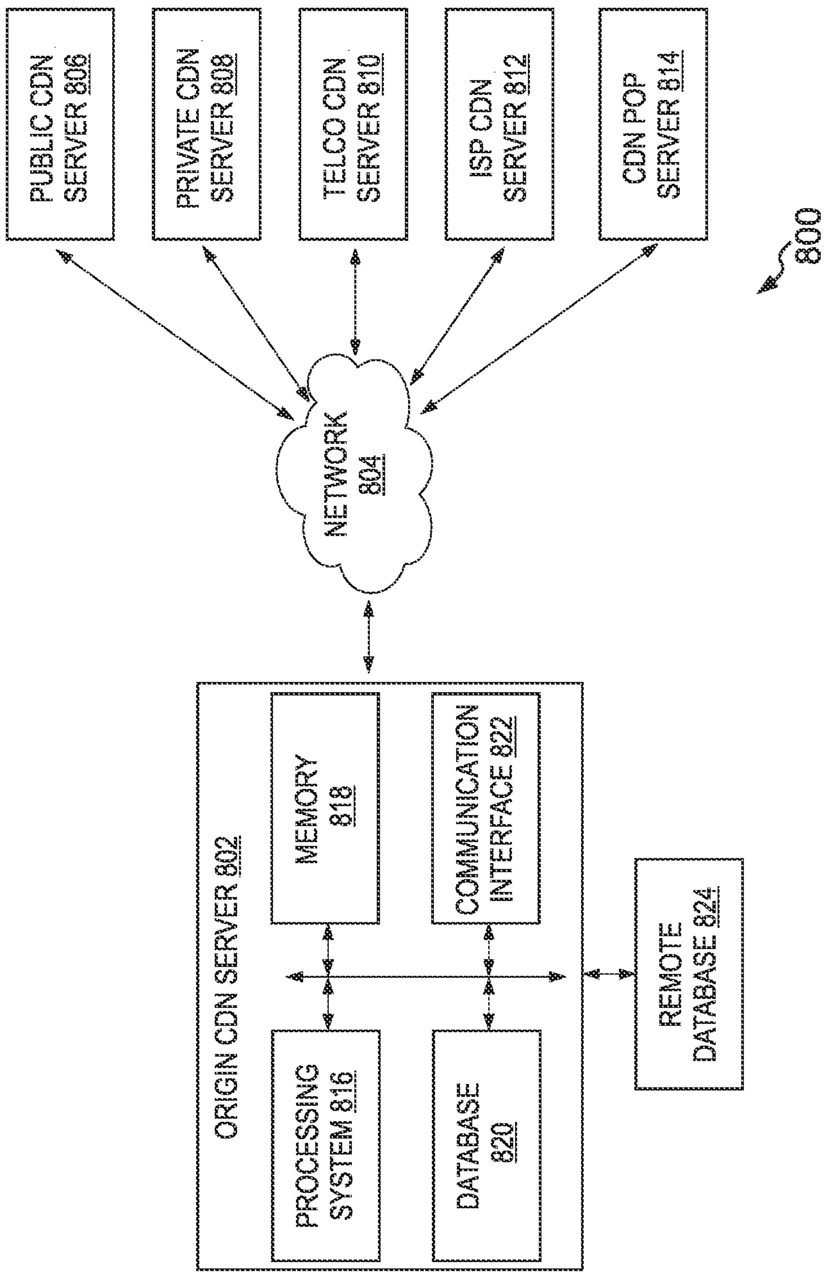
FIG. 8 is a simplified block diagram of a Content Delivery Network (CDN), in accordance with various embodiments of the invention.

FIG. 8 is a simplified block diagram of a Content Delivery Network (CDN) 800, in accordance with various embodiments of the invention. The CDN POPs 108 disclosed in FIG. 1 can be embodied with the CDN 800 of FIG. 8. As may be understood, the CDN 800 refers to a distributed group of servers that are connected via a network (such as Network 804, which is explained later). The CDN 800 provides quick delivery of media content to various content viewers (such as content viewer 102) subscribed to the digital platform server 120. The CDN 800 includes a plurality of interconnected servers that may interchangeably be referred to as a plurality of content repository servers. The CDN includes an origin CDN server 802, a public CDN server 806, a private CDN server 808, a Telecommunication CDN server (referred to hereinafter as 'Telco CDN server') 810, an Internet Service Provider CDN server (referred to hereinafter as 'ISP CDN server') 812, and a CDN point of presence server (referred to hereinafter as 'CDN POP server') 814 (similar to CDN POPs 108) each coupled to, and in communication with (and/or with access to) the network 804. The CDN POP server 814 is an example of the CDN POP 108 of FIG. 1. It is noted that CDN POP may also be interchangeably referred to as 'sub-CDNs', 'subnet CDN', 'surrogate CDN', and CDN sub-box'. Further, two or more components of the CDN 800 may be embodied in one single component, and/or one component may be configured using multiple sub-components to achieve the desired functionalities. Some components of the CDN 800 may be configured using hardware elements, software elements, firmware elements, and/or a combination thereof.

The network 804 may include, without limitation, a light fidelity (Li-Fi) network, a local area network (LAN), a wide area network (WAN), a metropolitan area network (MAN), a satellite network, the Internet, a fiber-optic network, a coaxial cable network, an infrared (IR) network, a radio frequency (RF) network, a virtual network, and/or another suitable public and/or private network capable of supporting communication among two or more of the parts illustrated in FIG. 8, or any combination thereof. Various servers within the CDN 800 may connect to the network 804 using various wired and wireless communication protocols, such as Transmission Control Protocol and Internet Protocol (TCP/IP), User Datagram Protocol (UDP), 2nd Generation (2G), 3rd Generation (3G), 4th Generation (4G), 5th Generation (5G) communication protocols, Long Term Evolution (LTE) communication protocols, future communication protocols or any combination thereof. For example, the network 804 may include multiple different networks, such as a private network made accessible by the origin CDN server 802 and a public network (e.g., the Internet, etc.) through which the various servers may communicate.

The origin CDN server 802 stores the media content accessed/downloaded from the streaming content provider and/or content producers. The origin CDN server 802 serves the media content to one or more cache servers which are either located in the vicinity of the content viewer 102 or the subscriber or connected to another cache server located in the content viewer's vicinity. In various examples, cache servers include the public CDN server 806, the private CDN server 808, the Telco CDN server 810, the ISP CDN server 812, the CDN POP server 814, and the like.

The origin CDN server 802 includes a processing system 816, memory 818, database 820, and communication interface 822. The processing system 816 is configured to extract programming instructions from the memory 818 to perform various functions of the CDN 800. In one example, the processing instructions include instructions for ingesting media content via the communication interface 822 from a remote database 824 which may further include one or more data repositories/databases (not shown) to an internal database such as database 820. The remote database 824 is associated with a streaming content provider and/or content producer. In another example, the media content stored within the database 820 can be served to one or more cache servers via the communication interface 822 over the network 804.

In some examples, the public CDN server 806 is associated with a public CDN provider which hosts media content among other types of data for different content providers within the same server. The private CDN server 808 is associated with a private CDN provider (such as a streaming content provider) which hosts media content for serving the needs of its subscribers. The Telco CDN server 810 is associated with telecommunication service providers which provide content hosting services to various entities such as the streaming content platform. The ISP CDN server 812 is associated with internet service providers which provide content hosting services to various entities such as the streaming content platform. The CDN POP server 190 caches content and allows the electronic devices of the content viewers to stream the content. It is noted that the various cache servers download and cache media content from the origin CDN server 802 and further allow a valid user or content viewer to stream the media content.

It is noted that various embodiments of the present disclosure, the various functions of the system 200, or the method disclosed in FIG. 5, FIG. 6 and/or FIGS. 7A-7B, can be implemented using any one or more components of the CDN 800 such as the origin CDN server 802 and/or one or more cache servers individually and/or in combination with each together. Alternatively, the system 200 can be communicably coupled with the CDN 800 to perform the various embodiments or methods described by the present disclosure.

Various embodiments disclosed herein provide numerous advantages. More specifically, the embodiments disclosed herein suggest techniques for encoding content in an improved way for content viewers. Such improved encoding of content gracefully adapts based on network conditions or device limitations and employs a scalable format across legacy and state-of-art devices. Further, the encoding of each image frame at different bitrates and/or resolutions ensures improved limits on quality of streaming media content which adapts gracefully to fluctuating mobile networks and consumes lesser bandwidth. Moreover, video personalization by providing different camera angles or different camera exposures for viewers in real-time provides an enjoyable and seamless content viewing experience to the users. Furthermore, it is understood that though various embodiments have been explained with reference to image frames, these embodiments can easily be applied to audio frames as well and the same will still be within the scope of the present invention.

The foregoing descriptions of specific embodiments of the present invention have been presented for purposes of illustration and description. They are not intended to be exhaustive or to limit the present invention to the precise forms disclosed, and obviously many modifications and variations are possible in light of the above teaching. The exemplary embodiment was chosen and described in order to best explain the principles of the present invention and its practical application, to thereby enable others skilled in the art to best utilize the present invention and various embodiments with various modifications as are suited to the particular use contemplated.

In the current disclosure, reference is made to various embodiments. However, it should be understood that the present disclosure is not limited to specific described embodiments. Instead, any combination of the preceding features and elements, whether related to different embodiments or not, is contemplated to implement and practice the teachings provided herein. Additionally, when elements of the embodiments are described in the form of "at least one of A and B," it will be understood that embodiments including element A exclusively, including element B exclusively, and including element A and B are each contemplated. Furthermore, although some embodiments may achieve advantages over other possible solutions or over the prior art, whether or not a particular advantage is achieved by a given embodiment is not limiting of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, embodiments described herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments described herein may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations or block diagrams of methods, apparatuses (systems), and computer program products according to embodiments of the present disclosure. It will be understood that each block of the flowchart illustrations or block diagrams, and combinations of blocks in the flowchart illustrations or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations or block diagrams.

The flowchart illustrations and block diagrams in the Figures illustrate the architecture, functionality, and operation of possible implementations of systems, methods, and computer program products according to various embodiments of the present disclosure. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order or out of order, depending upon the functionality involved. It will also be noted that each block of the block diagrams or flowchart illustrations, and combinations of blocks in the block diagrams or flowchart illustrations, can be implemented by special purpose hardware-based systems that perform the specified functions or acts, or combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:

1. A method, comprising:

generating an encoded video content corresponding to a first video content by encoding a plurality of image frames relating to the first video content, comprising:

segmenting an image frame of the plurality of image frames into a plurality of image portions, wherein each image portion is associated with a corresponding portion identifier, of a plurality of portion identifiers;

assigning a tag for each of the plurality of image portions based on at least a plurality of viewer cohorts for a plurality of viewers, each of the plurality of viewer cohorts indicating a group of viewers, among the plurality of viewers, that share similar behaviour and network attributes, wherein the tag relates to at least one of: (i) a resolution or (ii) a bitrate for encoding the respective image portion, wherein assigning the tag for each of the plurality of image portions comprises determining the tag for each of the plurality of image portions using a supervised machine learning (ML) model; and encoding each image portion based on the respective assigned tag;

generating a media rendition record comprising the encoded video content and the plurality of portion identifiers; and transmitting the encoded video content over a communication network, wherein the media rendition record is used to reconstruct the first video content from the encoded video content.

2. The method of claim 1, wherein assigning the tag for each of the plurality of image portions is based on at least one of: (i) resolution or (ii) bitrate for a corresponding image portion different from the respective image portion.

3. The method of claim 2, wherein assigning the tag for each of the plurality of image portions is further based on a tag assignment policy relating to assigning tags to adjacent image portions.

4. The method of claim 1, further comprising generating the plurality of cohorts for the plurality of content viewers based, at least in part, on viewer behavior data.

5. The method of claim 1, wherein the supervised ML model is trained using at least one of: (i) data reflecting viewer preference for video content or (ii) data relating to playback quality experienced by at least one viewer of the plurality of viewers.

6. The method of claim 1, wherein assigning the tag for each of the plurality of image portions is further based on conditions of the communication network.

7. The method of claim 1, further comprising:

transmitting the media rendition record over the communication network to a viewer device, wherein the viewer device is configured to reconstruct the first video content from the encoded video content using the media rendition record.

8. A non-transitory computer-readable medium containing computer program code that, when executed by operation of one or more computer processors, performs operations comprising:

generating an encoded video content corresponding to a first video content by encoding a plurality of image frames relating to the first video content, comprising:

segmenting an image frame of the plurality of image frames into a plurality of image portions, wherein each image portion is associated with a corresponding portion identifier, of a plurality of portion identifiers;

assigning a tag for each of the plurality of image portions based on at least a plurality of viewer cohorts for a plurality of viewers, each of the plurality of viewer cohorts indicating a group of viewers, among the plurality of viewers, that share similar behaviour and network attributes, wherein the tag relates to at least one of: (i) a resolution or (ii) a bitrate for encoding the respective image portion, wherein assigning the tag for each of the plurality of image portions comprises determining the tag for each of the plurality of image portions using a supervised machine learning (ML) model; and encoding each image portion based on the respective assigned tag;

generating a media rendition record comprising the encoded video content and the plurality of portion identifiers; and transmitting the encoded video content over a communication network, wherein the media rendition record is used to reconstruct the first video content from the encoded video content.

9. The non-transitory computer-readable medium of claim 8, wherein assigning the tag for each of the plurality of image portions is based on at least one of: (i) resolution or (ii) bitrate for a corresponding image portion different from the respective image portion.

10. The non-transitory computer-readable medium of claim 8, wherein the operations further comprise generating the plurality of cohorts for the plurality of content viewers based, at least in part, on viewer behavior data.

11. A system, comprising:

a computer processor; and a memory having instructions stored thereon which, when executed on the computer processor, perform operations comprising:

generating an encoded video content corresponding to a first video content by encoding a plurality of image frames relating to the first video content, comprising:

segmenting an image frame of the plurality of image frames into a plurality of image portions, wherein each image portion is associated with a corresponding portion identifier, of a plurality of portion identifiers;

assigning a tag for each of the plurality of image portions based on at least a plurality of viewer cohorts for a plurality of viewers, each of the plurality of viewer cohorts indicating a group of viewers, among the plurality of viewers, that share similar behaviour and network attributes, wherein the tag relates to at least one of: (i) a resolution or (ii) a bitrate for encoding the respective image portion, wherein assigning the tag for each of the plurality of image portions comprises determining the tag for each of the plurality of image portions using a supervised machine learning (ML) model; and encoding each image portion based on the respective assigned tag;

generating a media rendition record comprising the encoded video content and the plurality of portion identifiers; and transmitting the encoded video content over a communication network, wherein the media rendition record is used to reconstruct the first video content from the encoded video content.

12. The system of claim 11, wherein assigning the tag for each of the plurality of image portions is based on at least one of: (i) resolution or (ii) bitrate for a corresponding image portion different from the respective image portion.

13. The system of claim 11, wherein the operations further comprise generating the plurality of cohorts for the plurality of content viewers based, at least in part, on viewer behavior data.

* * * * *